US010360277B2

(12) United States Patent
Chesla et al.

(10) Patent No.: US 10,360,277 B2
(45) Date of Patent: Jul. 23, 2019

(54) CONTROLLING DATA MIGRATION

(71) Applicant: Microsoft Technology Licensing, LLC, Redmond, WA (US)

(72) Inventors: Brandon Chesla, San Francisco, CA (US); Michael Christopher Pruett, Los Gatos, CA (US); Luke Liu, Fremont, CA (US); Robert Nakamoto, San Jose, CA (US); Theodore Ni, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 501 days.

(21) Appl. No.: 15/198,646

(22) Filed: Jun. 30, 2016

(65) Prior Publication Data

US 2017/0061027 A1  Mar. 2, 2017

Related U.S. Application Data

(60) Provisional application No. 62/212,384, filed on Aug. 31, 2015.

(51) Int. Cl.
*G06F 16/23* (2019.01)
*G06F 16/25* (2019.01)
*G06F 16/27* (2019.01)
*G06F 16/955* (2019.01)
*G06F 16/21* (2019.01)

(52) U.S. Cl.
CPC .......... *G06F 16/955* (2019.01); *G06F 16/214* (2019.01); *G06F 16/23* (2019.01); *G06F 16/258* (2019.01); *G06F 16/27* (2019.01)

(58) Field of Classification Search
None
See application file for complete search history.

(56) References Cited

U.S. PATENT DOCUMENTS 10,157,214 B1  12/2018  Abuomar et al.
2004/0064480 A1*  4/2004  Bartlett ............... G06F 9/44505
(Continued)

OTHER PUBLICATIONS

"Non Final Office Action Issued in U.S. Appl. No. 15/198,710", dated May 3, 2019, 19 Pages.

*Primary Examiner* — James Trujillo
*Assistant Examiner* — Cheryl M Shechtman
(74) *Attorney, Agent, or Firm* — Schwegman Lundberg & Woessner, P.A.

(57) ABSTRACT

A machine may be configured to migrate data among databases. For example, the machine determines a control signal value that indicates a migration state of a migration of member profile data associated with one or more members of a Social Networking Service (SNS) from one or more legacy databases to a consolidated database. The machine accesses member profile data at the one or more legacy databases, and causes a replication of the member profile data at the consolidated database. The causing of the replication includes transforming the member profile data from a schema associated with the one or more legacy databases to a schema associated with the consolidated database. The machine performs a data equivalency test. The machine, based on a result of the data equivalency test, modifies the control signal value to indicate a further migration state of the migration of the member profile data.

20 Claims, 9 Drawing Sheets

(56) References Cited

U.S. PATENT DOCUMENTS

| | | | |
|---|---|---|---|
| 2005/0208803 A1* | 9/2005 | Rohatgi | G06F 21/6236 |
| | | | 439/159 |
| 2008/0233957 A1* | 9/2008 | Akama | H04M 1/274516 |
| | | | 455/435.1 |
| 2009/0138525 A1* | 5/2009 | Mattox, Jr. | G06F 16/27 |
| 2012/0227086 A1* | 9/2012 | Dale | G06Q 50/01 |
| | | | 726/3 |
| 2013/0275320 A1 | 10/2013 | Moore et al. | |
| 2014/0095700 A1* | 4/2014 | Kaushansky | H04L 67/1095 |
| | | | 709/224 |
| 2015/0254257 A1 | 9/2015 | Kritchko et al. | |
| 2016/0286253 A1* | 9/2016 | Roskind | H04N 21/25808 |

* cited by examiner

CONTROLLING DATA MIGRATION

CLAIM OF PRIORITY

This application claims the benefit of priority, under 35 U.S.C. § 119(e), to U.S. Provisional Patent Application No. 62/212,384 by Pruett et al., filed on Aug. 31, 2015, which is hereby incorporated herein by reference in its entirety.

TECHNICAL FIELD

The present application relates generally to systems, methods, and computer program products for controlling migration of data among databases.

BACKGROUND

Generally, when migrating data from one repository to another, a testing strategy for verifying that the data has been transferred successfully may be implemented. A common approach to testing data migration relies on sampling. Sampling involves selecting and inspecting some subset of random data to ensure that the migration was completed as designed. Sampling is reliant on an acceptable level of error and an assumption pertaining to repeatability. An acceptable level of error implies that less than 100% of the data will be migrated without error and the level of error is inversely proportionate to the number of samples tested.

BRIEF DESCRIPTION OF THE DRAWINGS

Some embodiments are illustrated by way of example and not limitation in the figures of the accompanying drawings, in which.

DETAILED DESCRIPTION

Figure 1:
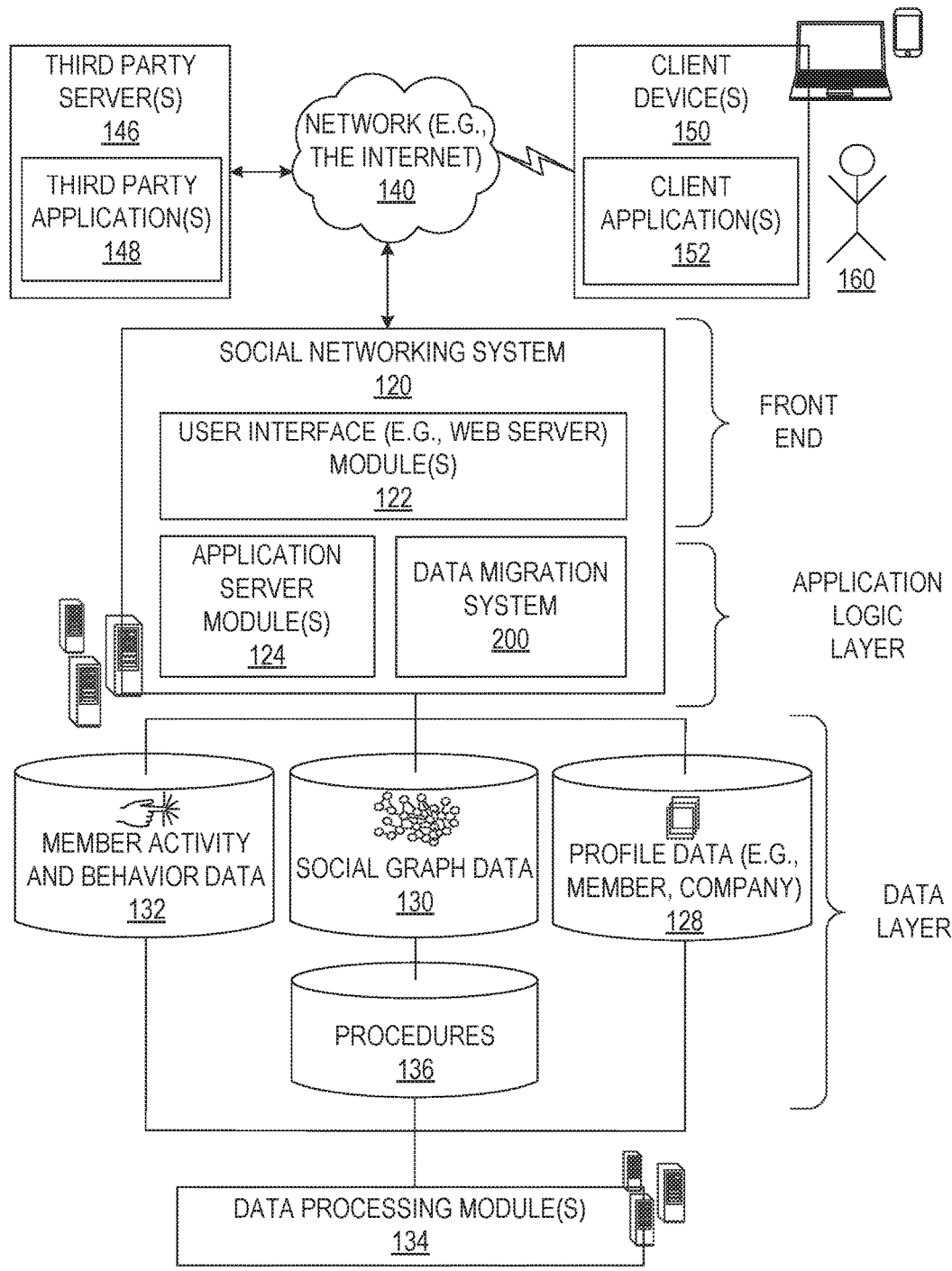
FIG. 1 is a network diagram illustrating a client-server system, according to some example embodiments.

Example methods and systems for controlling migration of data among databases are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

In some example embodiments, a data migration system migrates data from various legacy databases (hereinafter also "source databases") to a consolidated database (hereinafter also "target database") while maintaining the operation of a datacenter to allow users to continue to access or update data stored at the datacenter. A datacenter may be a group of networked computer servers typically used by organizations for storage, processing, or distribution of large amounts of data. Data migration is the process of transferring (e.g., replicating, propagating, etc.) data between various storage types, formats, databases, or computer systems. The term "legacy database," as used herein, refers to a database that includes data that is subject to a migration to a different database. The legacy database may or may not utilize older database technologies. One or more legacy databases may form a legacy database system (hereinafter also "legacy system"), and one or more consolidated databases may form a consolidated database system (hereinafter also "consolidated system").

The various legacy databases may be associated with various database schemas. The consolidated database is associated with a particular database schema that facilitates the integration of data from the various legacy databases. A database schema of a database or of a database system is its structure described in a formal language supported by the database management system (DBMS) and refers to the organization of data as a blueprint of how a database is constructed (e.g., divided into database tables in the case of relational databases, storage objects in the case of an object database, etc.).

The migration of the data among databases, by the data migration system, includes transforming the data from the schemas associated with one or more legacy databases to a schema associated with the consolidated database. The data migration also includes data validation of the entire data set being migrated from one or more legacy databases to the consolidated database in order to verify that the data was transformed correctly from one schema to another schema without resulting in erroneous data at the consolidated database. The result of the migration process is migrated data that includes data from different legacy databases that has been aggregated and stored at a consolidated database in a manner that preserves the accuracy of the data. The data migration system, while controlling the migration of the data, facilitates the continuous operation of the datacenter such that users (e.g., members of a social networking service, such as LinkedIn®) of the datacenter may seamlessly access or update data (e.g., member profile data).

In some example embodiments, the data transferred by the data migration system is member profile data of the members of a social networking service (hereinafter also "SNS"). Historically, the member profile data of a member may have been divided into a number of parts that were stored in different legacy databases. For example, a title of a member may be stored in a first legacy database, an image (e.g., a photograph) of the member may be stored in a second legacy database, and the name of the employer of the member may be stored in a third legacy database. When the member profile data associated with a member is stored in parts at different legacy databases, inconsistencies related to the storing and representation of the member profile data may appear. It may be beneficial to the social networking service to have the member profile data unified (e.g., consolidated) in one consolidated database rather than hosted in a divided form in separate databases. Example benefits of unifying the member profile data from separate legacy databases into one consolidated database are consistency of data representation across the member profile data, improved data storage efficiency, increased speed of access to data, faster data processing times, improved developer productivity, etc.

Before the migration of the data starts, the live traffic received from devices associated with the members of the SNS is directed to the one or more legacy databases. Examples of such live traffic are read requests or write requests pertaining to member profile data. As data is being transferred, certain live traffic pertaining to accessing migrated data is directed to the consolidated database, while other live traffic pertaining to accessing data that has yet to be migrated continues to be directed to one or more legacy databases. During the migration process, the data migration system may determine, based on the type of request and the type of data referenced in the request, to which database to direct the request. Upon migrating (e.g., propagating, persisting, etc.) all the data records from the one or more legacy databases to the consolidated database, all live traffic is served from the consolidated database.

In some example embodiments, the data migration system utilizes a control signal attribute associated with member identifiers of the members of the SNS to control the migration of data records pertaining to the members of the SNS. The control signal attribute may take a plurality of control signal values based on the migration state of member profile data pertaining to a particular member. At any particular time, the member profile data of a particular member is associated with one of the plurality of control signal values depending on the migration state of the member profile data of the particular member. The one of the plurality of control signal values is associated with a timestamp that indicates a time at which the particular migration state should take effect. Member identifiers of a plurality of members that are associated with a particular control signal value may be grouped based on the particular control signal value. This allows the migration (e.g., the transition to the next migration state) of the data records for the group of member identifiers associated with the particular control signal value at the time indicated by the timestamp associated with the particular control signal value. The control signal value and the associated timestamp are published across the data migration system in advance of the time indicated by the timestamp such that migration actions can be distributed to one or more machines running the data migration system, and can take effect at the same time across the one or more machines running the data migration system.

According to various example embodiments, the data migration system utilizes four migration states, each indicated by a particular control signal value. The particular control signal value indicating a particular migration state is associated with the member identifier of a particular member of the SNS. The member identifiers of various members of the SNS may be associated with one of the four control signal values based on the migration state in which the member profile data of the members is. The control signal value, the replication state, and the routing decision may be different for various members of the SNS.

In some example embodiments, the four migration states are:

First migration state: the data migration system directs all read requests and write requests that reference member identifiers associated with a first control signal value to the legacy system. The data migration system replicates the member profile data associated with the member identifiers associated with the first control signal value from the legacy system to the consolidated system. The data migration system verifies the data quality and equivalence between the legacy system and the consolidated system in the first migration state before the data migration system starts routing traffic to the consolidated system.

Second migration state: the data migration system directs slave read requests (e.g., a read request referencing member profile data of a first member that is received from a client device of a second member or a non-member) that reference member identifiers associated with a second control signal value to the consolidated system. Write requests and read requests which require read-after-write consistency (e.g., a request referencing member profile data of a first member that is received from a client device of the first member) are directed, by the data migration system, to the legacy system.

Third migration state: the data migration system directs slave read requests to the consolidated system. Write requests and read requests which require read-after-write consistency are directed, by the data migration system, to the consolidated system provided that the most recent change has already propagated to the consolidated system. In some instances, the data migration system determines that the most recent changes have propagated from the legacy system to the consolidated system based on performing a data equivalence test of the data at the legacy system and the consolidated system (e.g., by comparing the versions of the respective data records at the two systems).

In some example embodiments, some actions by the data migration system depend on whether or not the legacy and consolidated systems are in sync. However, the fact that the member identifier of a particular member is associated with the third migration state does not change. Under normal operating conditions, the two systems (e.g., the legacy and consolidated systems) may be out of sync for more than a few seconds if the particular member is actively editing his member profile at that time. Accordingly, in the third migration state, the data migration system reads both systems and determines whether the versions of the member profile data at the two systems match. If the data migration system discovers that the latest version has not propagated, the data migration system routes the request to the legacy system and fires (e.g., generates, communicates, etc.) a tracking event that indicates that there is at least one member who is actively editing the member's profile.

While in the third migration state, the data migration system waits for an interval of time to pass during which the data migration system does not receive any tracking events. In some example embodiments, the interval of time is longer than the propagation delay associated with the migration of data by the data migration system. Once an interval like this has expired without a tracking event being received, the data migration system determines that the records associated with the third control signal value are updated at the consolidated system, and can move the members to the fourth migration state (e.g., associate the member identifiers with the fourth control signal value) where the data migration system no longer needs to check the legacy system.

Fourth migration state: the data migration system directs all read requests and write requests to the consolidated system.

In some example embodiments, the data migration system performs data verification (e.g., data equivalency tests, data validation tests, or both) throughout all the migration states in order to verify that nothing unexpected has happened.

In certain example embodiments, to migrate the data to the consolidated database, the data migration system, accesses the logs generated at the one or more legacy databases during a period of time (e.g., one year, five years, the existence of the one or more legacy databases, etc.) that identify the traffic (e.g., write requests) that occurred during the period of time, replays that traffic, transforms the look of the data to conform to the schema of the consolidated database, validates that the transformed data is accurate (e.g., correctly reflects the pre-migration data), and stores the transformed data in the consolidated database.

An example technical problem that the data migration system is designed to solve is that of migrating a large volume of data while continuing the operation of one or more datacenters that utilize the data. Traditionally, when migrating data from one database to another, a linear, sequential process is used. This process may take a long time, and may require engineers to stop the process numerous times to correct the errors that may be identified.

The data migration system may offer a technical solution to this technical problem. In some example embodiments, the data migration system utilizes a distributed processing job (e.g., a Hadoop job) that transforms the large volume of data from the schemas of the one or more legacy databases to the schema of the consolidated database in an offline fashion, tests the transformed data (e.g., based on equivalency and validation tests), imports the transformed data into the consolidated database, and stores the transformed data at the consolidated database. For example, the data migration system runs a Hadoop job against the member profile data records pertaining to one or more members of the SNS to migrate the member profile data to the consolidated database. The Hadoop job may run continuously, periodically, or on demand. The massive parallelism of the Hadoop job allows for iterative processing of large volumes of data to timely identify and correct errors, and to validate the transformed data.

The errors identified by the data migration system may be caused by unanticipated data patterns within user data (e.g., data provided by a member when requesting the generation of a member profile, or when editing the member profile). For example, a data field in a member profile that should not allow an input written in French shows a data string written in French. In some instances, if certain consistency checks, validation rules, or assumptions associated with the code utilizing the member-provided data, or with the member-provided data itself, are not enforced throughout a period of collecting the data, then some subset of the member-provided data defies the expectations that engineers may associate with that type of data. The data migration system may address this problem based on automatically consolidating, validating, and correcting the member profile data during the migration of the member-provided from the one or more legacy databases to the consolidated database.

In some example embodiments, the transformed data is validated (e.g., verified and confirmed), by the data migration system, as accurate. To convert data from a first schema (e.g., format, structure, organization, etc.) to a second schema, the data migration system may pass the source data through a conversion routine to obtain converted data. In some instances, the data migration system executes a function $f(x)=y$, where the parameter x includes the source data, to transform the source data "x" into the target converted data "y."

The data migration system may then verify the converted data against the source data to determine whether the source data and the converted data are equivalent (e.g., convey the same information; have the same value or meaning; etc.). For example, the data migration system may utilize a reverse conversion function, such as $f'(y)=x$ to determine whether the representation (e.g., value or meaning, etc.) of the data is the same regardless of the change in format (e.g., structure, organization, etc.) from the schema associated with the source data to the schema associated with the target converted data, and vice versa.

According to another example, if the target conversion data includes source data combined from different records (e.g., from different legacy databases with different schemas), the data migration system executes a function $f(x1, x2, x3)=y$, where the parameters x1, x2, and x3 include source data in records of different legacy databases, to combine and transform the source data "x1, x2, x3" into the target converted data "y."

The data migration system may then verify the converted data against the source data to determine whether the source data and the converted data are equivalent. For example, the data migration system utilizes a reverse conversion function, such as $f'(y)=x1, x2, x3$ to determine whether the representation of the converted data is the same as the source data regardless of the change in format from the schemas associated with the source databases to the schema associated with the consolidated database, and vice versa.

In yet another example, based on a function $g(x,y)$ that may have a "Yes" or "No" result, where "x" is the source data and "y" is the converted data, the data migration system determines whether the converted data "y" is equivalent to (e.g., equal to, the same as, etc.) the source data "x." A "Yes" result indicates that the source data and the converted data are equivalent, and that the conversion of the source data to the converted data was performed correctly. For example, if the source data is in the format of "first name, last name," a correct conversion would result in converted data in the format "first name, last name." If, for instance, the data migration system applies the equivalency determination function g (x,y) to the source data "John, Smith" and the converted data is "Smith, John," the function returns the result "No." Based on this result, the data migration system determines that the conversion of the source data was erroneous. Then, the data migration system may facilitate the correction of the conversion of the source data, and may re-iterate the validation process discussed above.

In some example embodiments, once the data migration system determines that the conversion errors have been corrected, the data migration system may bulk load the converted and validated offline data to the consolidated database. The data migration system may then direct the user-originated traffic (e.g., read requests and write requests received from devices associated with the members of the SNS) to the consolidated database.

In Information Systems design and theory, the Source Of Truth (hereinafter also "SOT") concept refers to the practice of structuring information models and associated schemata such that a particular source of a data element is designated as the master copy from which any possible copy of the data element (e.g., one or more data records) is derived. The source of the master copy of the data element is called the Source of Truth for the data element. The possible copies of the data element may be replicas of the master copy that are used for providing redundancy, capacity to serve more traffic, or both.

In some example embodiments, the consolidated database is designated as the SOT for certain member profile data after certain member profile data has been successfully migrated to the consolidated database. Then, the user-originated traffic pertaining to accessing the certain member profile data may be directed to (e.g., serviced by) the consolidated database.

In various example embodiments, the data migration system determines a control signal value of a control signal attribute based on accessing the control signal attribute at a record of a database. The control signal value indicates a migration state of a migration of member profile data associated with one or more members of a Social Networking Service (SNS) from one or more legacy databases to a consolidated database. The control signal value is associated with one or more member identifiers of the one or more members. At a time indicated by a timestamp associated with the control signal value, the data migration system, based on the one or more member identifiers associated with the control signal value, accesses member profile data associated with the one or more member identifiers at the one or more legacy databases, and causes a replication of the accessed member profile data at the consolidated database. The causing of the replication may include transforming the member profile data from a first schema associated with the one or more legacy databases to a second schema associated with the consolidated database. Upon the causing of the replication of the member profile data at the consolidated database, the data migration system performs, using one or more hardware processors, a data equivalency test based on the member profile data at the one or more legacy databases and the member profile data at the consolidated database. The data migration system, based on a result of the data equivalency test, modifies the control signal value to indicate a further migration state of the migration of the member profile data associated with the one or more members.

An example method and system for controlling data migration among databases may be implemented in the context of the client-server system illustrated in FIG. 1. As illustrated in FIG. 1, the data migration system 200 is part of the social networking system 120. As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Window® Phone).

For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of a social graph. In some example embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

Consistent with some embodiments, when a person initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132. An example of such activity and behavior data is the identifier of an online ad consumption event associated with the member (e.g., an online ad viewed by the member), the date and time when the online ad event took place, an identifier of the creative associated with the online ad consumption event, a campaign identifier of an ad campaign associated with the identifier of the creative, etc.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the SNS may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130. In some example embodiments, members may receive digital communications (e.g., advertising, news, status updates, etc.) targeted to them based on various factors (e.g., member profile data, social graph data, member activity or behavior data, etc.)

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For example, an ad serving engine showing ads to users may be implemented with one or more application server modules 124. According to another example, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include the data migration system 200, which is described in more detail below.

Further, as shown in FIG. 1, a data processing module 134 may be used with a variety of applications, services, and features of the social networking system 120. The data processing module 134 may periodically access one or more of the databases 128, 130, 132, or 136, process (e.g., execute batch process jobs to analyze or mine) profile data, social graph data, member activity and behavior data, or procedures, and generate analysis results based on the analysis of the respective data. The data processing module 134 may operate offline. According to some example embodiments, the data processing module 134 operates as part of the social networking system 120. Consistent with other example embodiments, the data processing module 134 operates in a separate system external to the social networking system 120. In some example embodiments, the data processing module 134 may include multiple servers, such as Hadoop servers for processing large data sets. The data processing module 134 may process data in real time, according to a schedule, automatically, or on demand.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
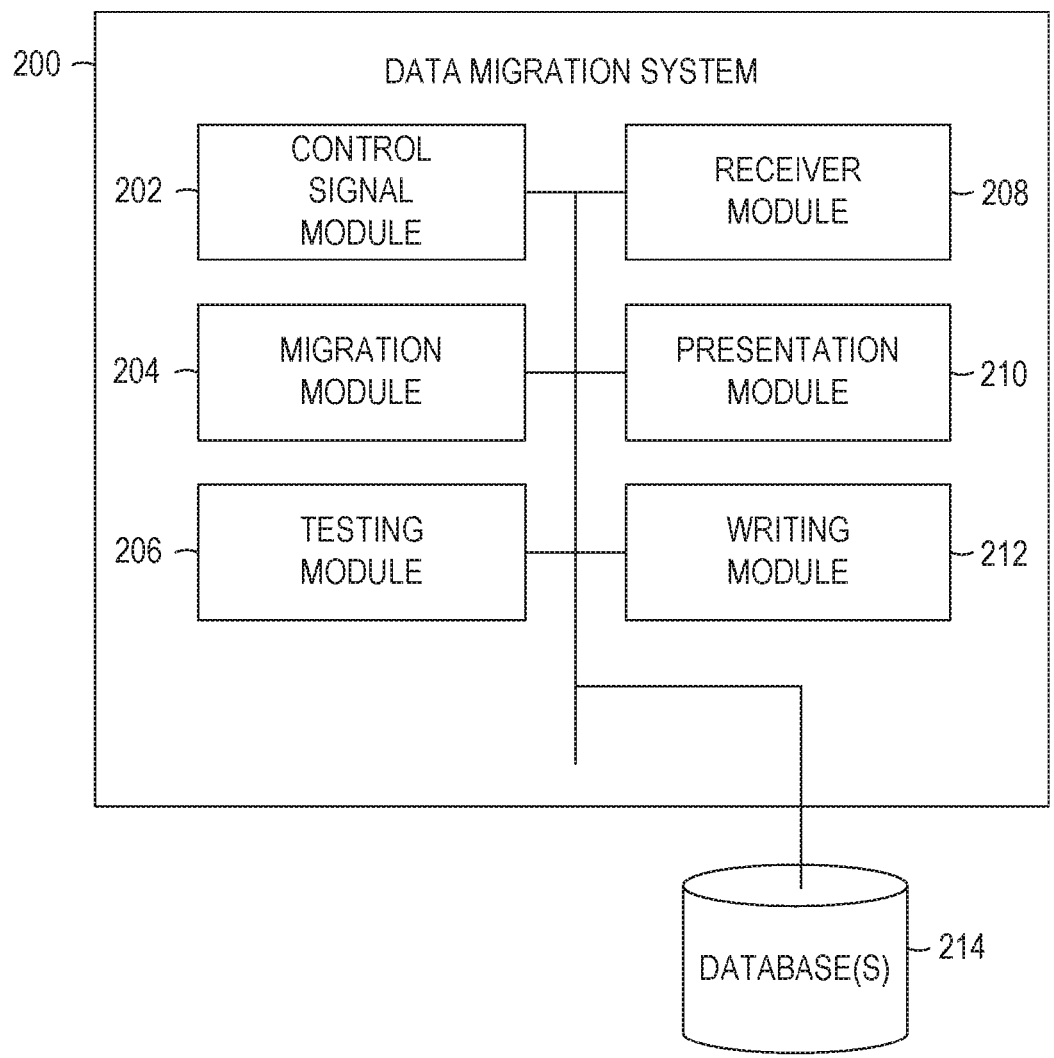
FIG. 2 is a block diagram illustrating components of a data migration system, according to some example embodiments.

FIG. 2 is a block diagram illustrating components of the data migration system 200, according to some example embodiments. As shown in FIG. 2, the data migration system 200 includes a control signal module 202, a migration module 204, a testing module 206, a receiver module 208, a presentation module 210, and a writing module 212, all configured to communicate with each other (e.g., via a bus, shared memory, or a switch).

According to some example embodiments, the control signal module 202 accesses a control signal attribute at a record of a database (e.g., database 216) of the data migration system 200, and determines a control signal value of the control signal attribute based on the accessing of the control signal attribute at the record of database. The control signal value indicates a migration state of a migration of member profile data associated with one or more members of the SNS from one or more legacy databases to a consolidated database. The control signal value may be one of a plurality of control signal values that could be associated with the control signal attribute. A particular control signal value is associated with one or more member identifiers of the one or more members of the SNS. The control signal value is also associated with a timestamp that indicates a time at which the particular migration state should take effect.

The migration module 204 accesses, based on the one or more member identifiers associated with the control signal value, member profile data associated with the one or more member identifiers at the one or more legacy databases. The migration module 204 may access the member profile data associated with the one or more member identifiers at the time indicated by the timestamp associated with the control signal value.

The migration module 204 causes, at the time indicated by the timestamp associated with the control signal value, a replication (e.g., migration, copying, transferring, etc.) of the accessed member profile data at the consolidated database. The causing of the replication may include transforming the member profile data from a first schema associated with the one or more legacy databases to a second schema associated with the consolidated database. The first schema may define an organization (e.g., a structure) of the member profile data at the one or more legacy databases. The second schema may define an organization (e.g., a structure) of the member profile data at the consolidated database.

The testing module 206 performs a data equivalency test based on the member profile data at the one or more legacy databases and the member profile data at the consolidated database. The data equivalency test may be performed upon the causing of the replication of the member profile data at the consolidated database. The testing module 206 generates a result of the data equivalency test as part of performing the data equivalency test.

In some example embodiments, the testing module 206 determines that the member profile data associated with a particular member at the consolidated database is equivalent (e.g., the same) with the member profile data associated with the particular member at the one or more legacy databases. The member profile data at the legacy databases and at the consolidated database may be associated with one or more versions of the member profile data. In some instances, the version number of an individual record is embedded in the record data itself, and carried over to the consolidated schema as well. Accordingly, the consolidated member profile data indicates which version of each legacy record was used to generate the consolidated record.

In some example embodiments, a purpose of utilizing versions is to indicate whether there has been an update to a legacy record associated with a member which has not yet propagated to the consolidated record associated with the member. The data equivalency of the legacy and consolidated records is established at the time of the data propagation from the one or more legacy databases to the consolidated database. Accordingly, if the propagation is complete, the data at the consolidated database and the one or more legacy databases is considered equivalent. Vice versa, if the data at the consolidated database and the one or more legacy databases is determined to not be equivalent, the propagation of the member profile data is not complete. In some example embodiments, whether the propagation of the member profile data pertaining to a particular member has or has not been completed at the consolidated database is reflected in the control signal value associated with the member identifier of the particular member.

In some instances, the member profile data associated with a particular member at a legacy database and the member profile data associated with the particular member at the consolidated database are equivalent if the versions of the member profile data at the two databases are the same (e.g., the first version number is identical to the second version number). The identifying of the versions and the determining that the member profile data are equivalent at the two databases may be based on the member identifier of the member associated with the member profile data at the first and second databases.

The testing module 206 may also perform a validation test. The performing of the validation test may include validating that the transformed member profile data at the consolidated database is equivalent to the member profile data at the one or more legacy databases based on one or more data validation functions.

The control signal module 202, based on the result of the data equivalency test, modifies the control signal value to indicate a further migration state of the migration of the member profile data associated with the one or more members.

The receiver module 210 receives a request (e.g., a read request or a write request) to access member profile data pertaining to a member of the SNS from a client device. The request may be a read request or a write (e.g., a data update) request. The request references a member identifier of the member. The member profile data may include at least one of an identifier of the member, a title of the member, a photograph of the member, an identifier of an employer of the member, and an identifier of an educational institution associated with the member. Other types of data may also be included in the member profile data.

The receiver module 210 may determine, based on the request, whether the request is a read request or a write request, and whether the request is for reading or updating the requester's member profile data, or for reading a different member's profile data. Various actions may be taken by one or more modules of the data migration system 200 based on the type of request received from the client device, based on whether or not the request is for the member's own profile data, based on the migration state of the member profile data requested to be accessed in the request received from the client device, or based on a suitable combination thereof.

The presentation module 210 causes a presentation of various information pertaining to the migration of member profile data in a user interface of a client device associated with a user (e.g., an administrator of the data migration system 200), such as a control signal value associated with one or more member identifiers of one or more members of the SNS. The control signal value displayed in the user interface may communicate to the user the migration state of the member profile data pertaining to the one or more members.

The presentation module 210, in some example embodiments, causes the presentation member profile in a user interface of a client device associated with a member of the SNS in response to the receiver module 208 receiving the request (e.g., a read request or a write request) to access member profile data pertaining to the member of the SNS from the client device.

In certain example embodiments, the control signal module 202 identifies, based on the member identifier, the control signal value that indicates a migration state of the member profile data associated with the member identifier from the one or more legacy databases to the consolidated database. The presentation module 210 causes a servicing of the request to access the data pertaining to the member of the SNS from the consolidated database or the one or more legacy databases based on the control signal value.

The writing module 212 writes (e.g., updates) member profile data in a record of the one or more legacy databases or the consolidated database. The writing (or updating) of the member profile data may be based on (e.g., in response to) a write request received from a client device associated with a user of the data migration system 200.

To perform one or more of its functionalities, the data migration system 200 may communicate with one or more other systems. For example, an integration system may integrate the data migration system 200 with one or more email server(s), web server(s), one or more databases, or other servers, systems, or repositories.

Any one or more of the modules described herein may be implemented using hardware (e.g., one or more processors of a machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 214 (e.g., database 128, 130, 132, or 136).

Figure 3:
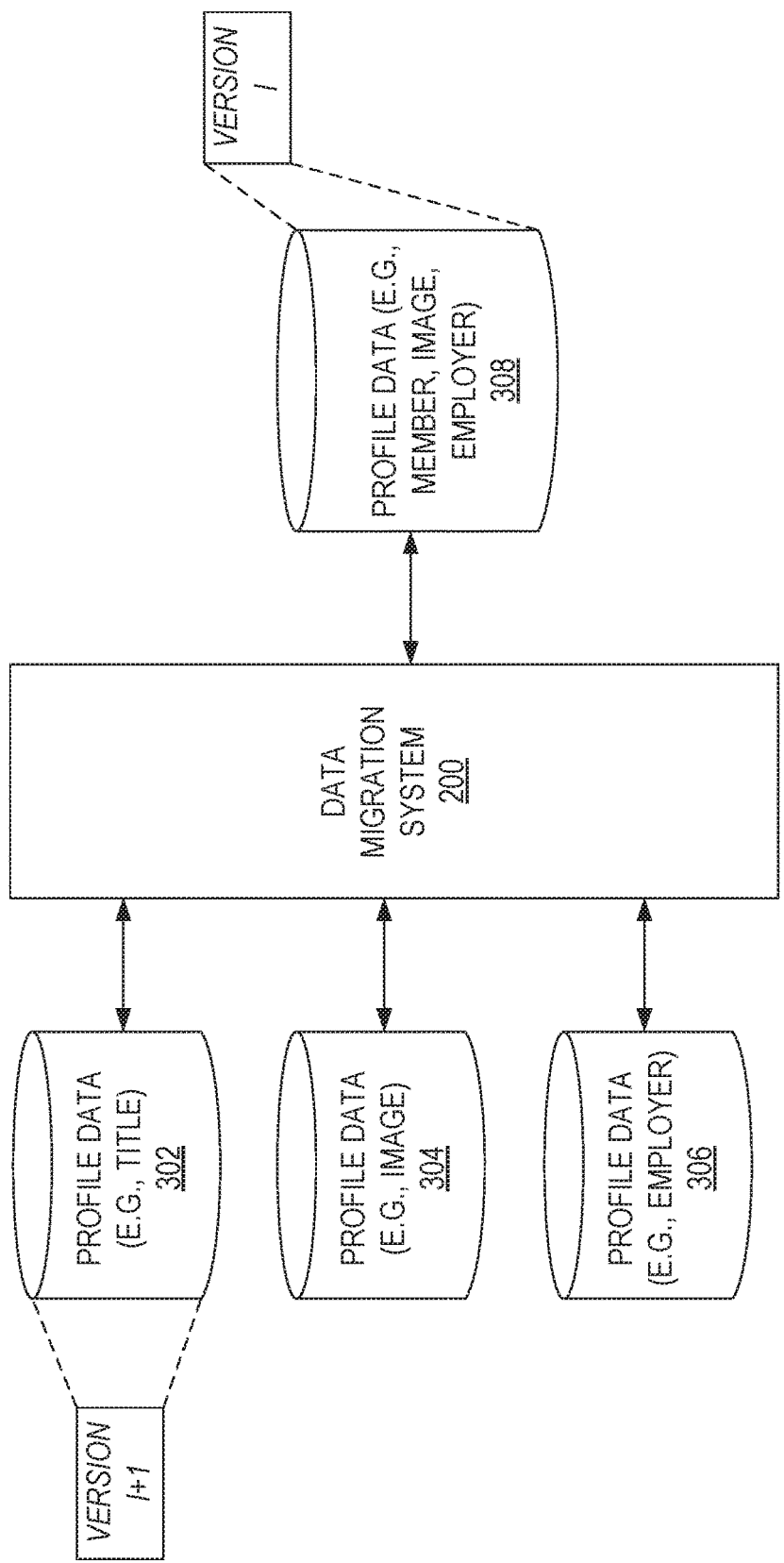
FIG. 3 is a functional representation of an example data migration system, according to some example embodiments.

FIG. 3 is a functional representation of an example data migration system, according to some example embodiments. As shown in FIG. 3, the data migration system 200 may access member profile data stored at a number of legacy databases (e.g., database 302, 304, or 306) and may migrate the accessed member profile data to consolidated database 308.

In some example embodiments, the data migration system 200 accesses member profile data associated with a particular member stored at a number of legacy databases, aggregates the accessed member profile data, and migrates the aggregated member profile data associated with the particular member to the consolidated database 308. For example, the data migration system 200 accesses, based on a member identifier (e.g., a unique alpha-numeric sequence) associated with a particular member of the SNS, a title of the particular member at the legacy database 302, an image (e.g., photograph) file associated with the particular member at the legacy database 304, and an identifier (e.g., a name) of the employer of the particular member at the legacy database 306. The data migration system 200 transforms the accessed member profile data from the respective database schemas associated with the legacy databases 302, 304, and 306 to the database schema associated with the consolidated database. The data migration system 200 validates that the transformed member profile data is equivalent with the data accessed at the legacy databases 302, 304, and 306 (e.g., the title, image, and employer identifier). Then, the data migration system 200 stores the validated member profile data in one or more records at the consolidated database 308.

As described above, the member profile data at a particular database may be associated with a particular version. For instance, each legacy record has (e.g., is associated with) its own version (e.g., the version information is embedded in the records themselves). The consolidated schema may record the versions.

According to an example, as shown in FIG. 3, the member profile data at the consolidated database 308 is associated with a version i and the member profile data at the legacy database is associated with a newer version "i+1". The versions i and i+1 indicate that the member profile data at the legacy database 302 and the member profile data at the consolidated database 308 are not the same. The data migration system 200 determines that the member profile data associated with the member at the consolidated database 308 is not equivalent with the member profile data associated with the member at the legacy database 302 based on determining that version i is different from version i+1. To make this determination, the data migration system 200 may identify a first version (e.g., version i) of the member profile data associated with the member at the consolidated database 308, may identify a second version (e.g., version i+1) of the member profile data associated with the member at the legacy database 302, and may determine that the first version of the member profile data and the second version of the member profile data are not the same (e.g., based on comparing the identifiers of versions i and i+1). A difference in versions at a legacy database and at the consolidated database may indicate that changes made to a record at the legacy database have not yet propagated to the consolidated database. In some example embodiments, certain requests for data access (e.g., a request for member profile data of a particular member received from a client device of the particular member) will continue to be directed to the legacy database instead of the consolidated database until all the changes have propagated to the consolidated database (e.g., the data associated with the newer version has been migrated to the consolidated database).

Figure 4:
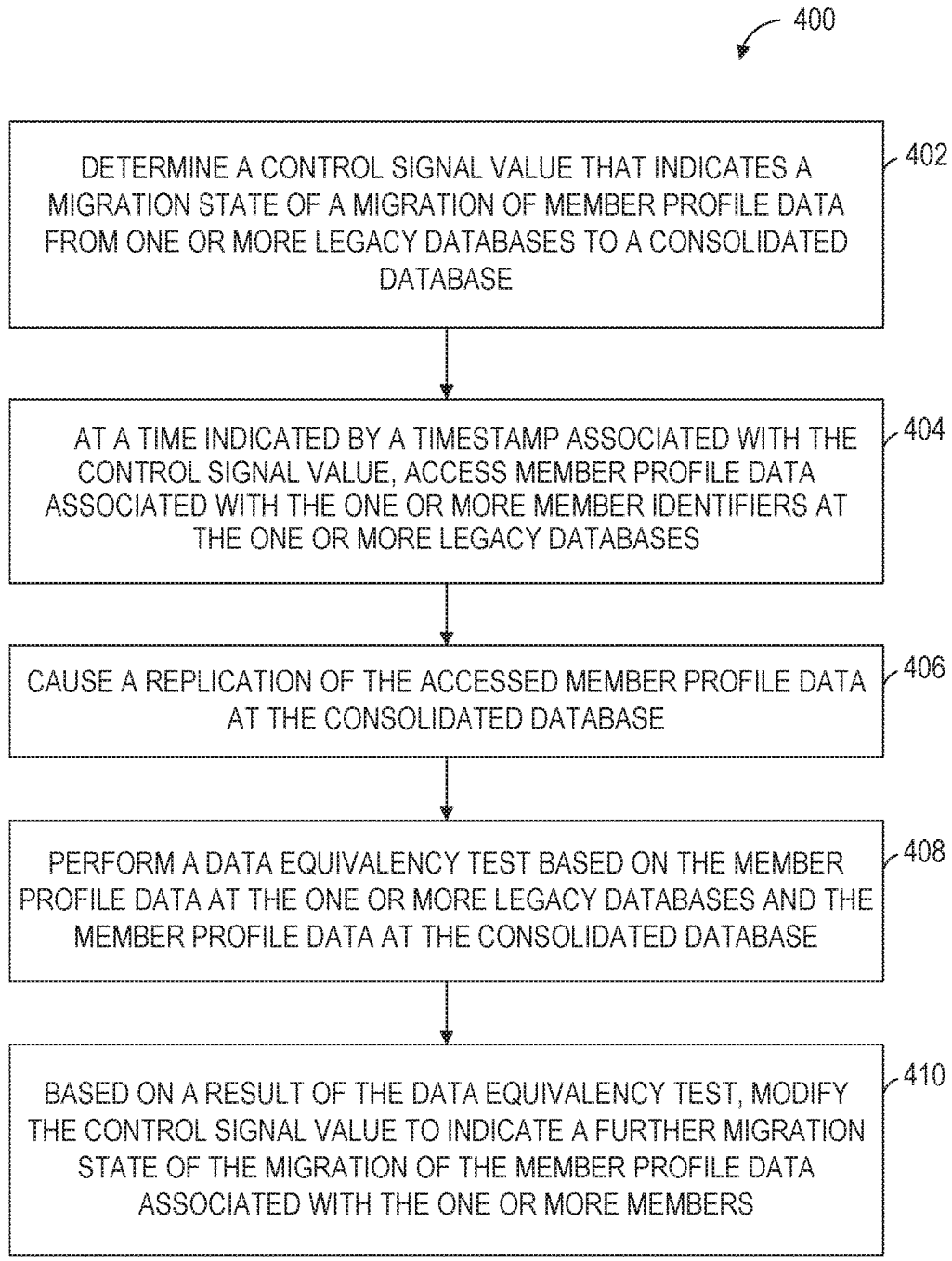
FIG. 4 is a flowchart illustrating a method for controlling the migration of data among databases, according to some example embodiments.

FIGS. 4-7 are flowcharts illustrating a method for migrating data among databases, according to some example embodiments. Operations in the method 400 illustrated in FIG. 4 may be performed using modules described above with respect to FIG. 2. As shown in FIG. 4, method 400 may include one or more of method operations 402, 404, 406, 408, and 410, according to some example embodiments.

At operation 402, the control signal module 202 determines a control signal value of a control signal attribute based on accessing the control signal attribute at a record of a database. The control signal value indicates a migration state of a migration of member profile data associated with one or more members of a Social Networking Service (SNS) from one or more legacy databases to a consolidated database. The control signal value is associated with one or more member identifiers of the one or more members. One or more components of the member profile data of a member of the SNS may correspond to one or more attributes that describe the member of the SNS (e.g., a name, a title, a geographic location, a name of an employer, a name of an educational institution, a identifier of a skill, a photograph, a video, a contact identifier (e.g., a name of a contact), etc.).

At operation 404, the migration module 204, based on the one or more member identifiers associated with the control signal value, accesses member profile data associated with the one or more member identifiers at the one or more legacy databases. The migration module 204 may access the control signal value at a time indicated by a timestamp associated with the control signal value.

At operation 406, the migration module 204 causes a replication of the accessed member profile data at the consolidated database. The causing of the replication may include transforming the member profile data from a first schema associated with the one or more legacy databases to a second schema associated with the consolidated database. The migration module 204 may cause the replication at the time indicated by the timestamp associated with the control signal value upon the accessing of the control signal value.

At operation 408, the testing module 206 performs a data equivalency test based on the member profile data at the one or more legacy databases and the member profile data at the consolidated database. The testing module 206 may perform the data equivalency test upon the causing of the replication of the member profile data at the consolidated database.

In some example embodiments, the performing of the data equivalency test includes determining that the member profile data at the consolidated database is equivalent with the member profile data at the one or more legacy databases based on: identifying a first version of the member profile data associated with a member of the one or more members at the one or more legacy databases, identifying a second version of the member profile data associated with the member at the consolidated database, and determining that the first version of the member profile data and the second version of the member profile data are the same.

At operation 410, the control signal module 202, based on a result of the data equivalency test, modifies the control signal value to indicate a further migration state of the migration of the member profile data associated with the one or more members.

In some example embodiments, the result of the data equivalency test indicates that a recent change to the member profile data of a particular member has not propagated from one or more legacy databases to the consolidated database (e.g., the version of a record associated with a member at the consolidated database is not the same as the version of the record associated with the member at a legacy database). The modifying of the control signal value to indicate the further migration state may include modifying the control signal value to indicate a second migration state. The second migration state may indicate that slave read requests are to be directed to the consolidated database, and the write requests and read requests associated with a read-after-write consistency rule are to be directed to the one or more legacy databases.

In certain example embodiments, the result of the data equivalency test indicates that a recent change to the member profile data of a particular member has propagated to the consolidated database. The modifying of the control signal value to indicate the further migration state may include modifying the control signal value to indicate a third migration state. The modifying of the control signal to indicate the third migration state may be based on the result of the data equivalency test indicating that the recent change to the member profile data of the particular member has propagated to the consolidated database. The third migration state may indicate that slave read requests, and write requests and read requests associated with a read-after-write consistency rule are to be directed to the consolidated database.

In various example embodiments, the control signal module 202 listens, during a window of time, for tracking events that indicate that one or more members are editing one or more member profiles in real time. In some instances, the listening is performed when the control signal value indicates the third migration state. The control signal module 202 may determine that no tracking events are received during the window of time. Based on the determining that no tracking events are received during the window of time, the control signal module 202 may modify the control signal value to indicate a fourth migration state. The fourth migration state may indicate that read requests and write requests are to be directed to the consolidated database.

Further details with respect to the method operations of the method 400 are described below with respect to FIGS. 5-7.

Figure 5:
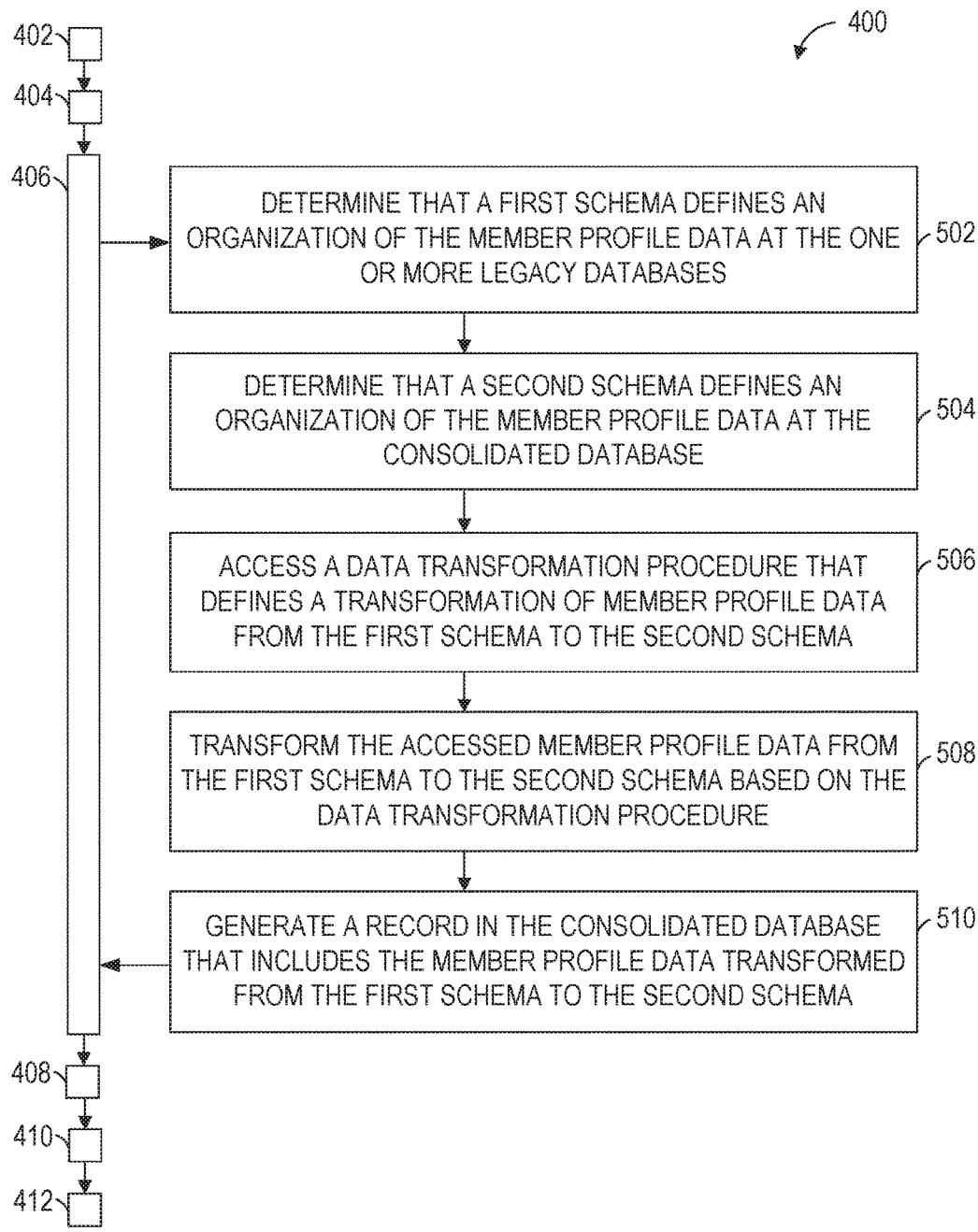
FIG. 5 is a flowchart illustrating a method for controlling the migration of data among databases, and representing step 406 of the method illustrated in FIG. 4 in more detail, according to some example embodiments.

As shown in FIG. 5, the method 400 may include one or more method operations 502, 504, 506, 508, and 510, according to some example embodiments. Operation 502 may be performed as part (e.g., a precursor task, a subroutine, or a portion) of operation 406 of FIG. 4, in which the migration module 204 causes a replication of the accessed member profile data at the consolidated database.

At operation 502, the migration module 204 determines that the first schema defines an organization of the member profile data at the one or more legacy databases. In some instances, the determining that the first schema defines the organization of the member profile data at the one or more legacy databases is based on determining that the one or more legacy databases are associated with the first schema. In some instances, the determining that the first schema defines the organization of the member profile data at the one or more legacy databases includes identifying a structure of the member profile data at the one or more legacy databases.

In some example embodiments, the determining that the first schema defines the organization of the member profile data at the one or more legacy databases includes identifying one or more parameters of the first schema based on analyzing a structure of the member profile data at the one or more legacy databases.

At operation 504, the migration module 204 determines that the second schema defines an organization of the member profile data at the consolidated database. In some instances, the determining that the second schema defines the organization of the member profile data at the consolidated database is based on determining that the consolidated database is associated with the second schema. In some instances, the determining that the second schema defines the organization of the member profile data at the consolidated database may include identifying a structure of the member profile data at the consolidated database.

At operation 506, the migration module 204 accesses a data transformation procedure (e.g., a transformation rule) that defines a transformation of (e.g., provides instructions how to transform) member profile data from the first schema to the second schema. The transformation procedure may be stored and accessed from a record of a database (e.g., procedures database 136). In some example embodiments, the transformation procedure specifies a conversion function for converting member profile data from the first data schema to the second data schema.

At operation 508, the migration module 204 transforms the accessed member profile data from the first schema to the second schema based on the data transformation procedure. The transforming of the member profile data may include transforming the structure (e.g., format) of the member profile data to correspond to the second schema.

In some example embodiments, the transformation procedure specifies the conversion function that transforms data from the first data schema to the second data schema, the accessed member profile data is a parameter of the conversion function, and the transforming includes executing the conversion function for converting the accessed member profile data from the first data schema to the second data schema.

For example, the migration module 208 executes a function f(x)=y, where the parameter x includes the source data, to transform the source data "x" into the target converted data "y." Accordingly, the source data "x" may be run through a conversion function f(x) to obtain the converted data "y." Examples of conversions are: (1) a combination of member profile data associated with a first legacy schema with member profile data associated with a second legacy schema into a single consolidated schema (e.g., the position title from a first record associated with a first legacy schema is combined with the member's employer location from a second record associated with a second legacy schema into a single consolidated position record); (2) a conversion of an ordered collection of records (e.g., patents) into two collections—one which stores position data in an indexed collection which allows efficient lookup by a patent identifier and another which stores the display order of the patents specified by the member; (3) replacing null or empty values in legacy records with default values specified by domain business logic.

At operation 510, the migration module 204 generates a record in the consolidated database that includes the member profile data transformed from the first schema to the second schema. In some example embodiments, instead of generating a record, the migration module 208 modifies an existing record in the second database to include the member profile data transformed from the first schema to the second schema.

Figure 6:
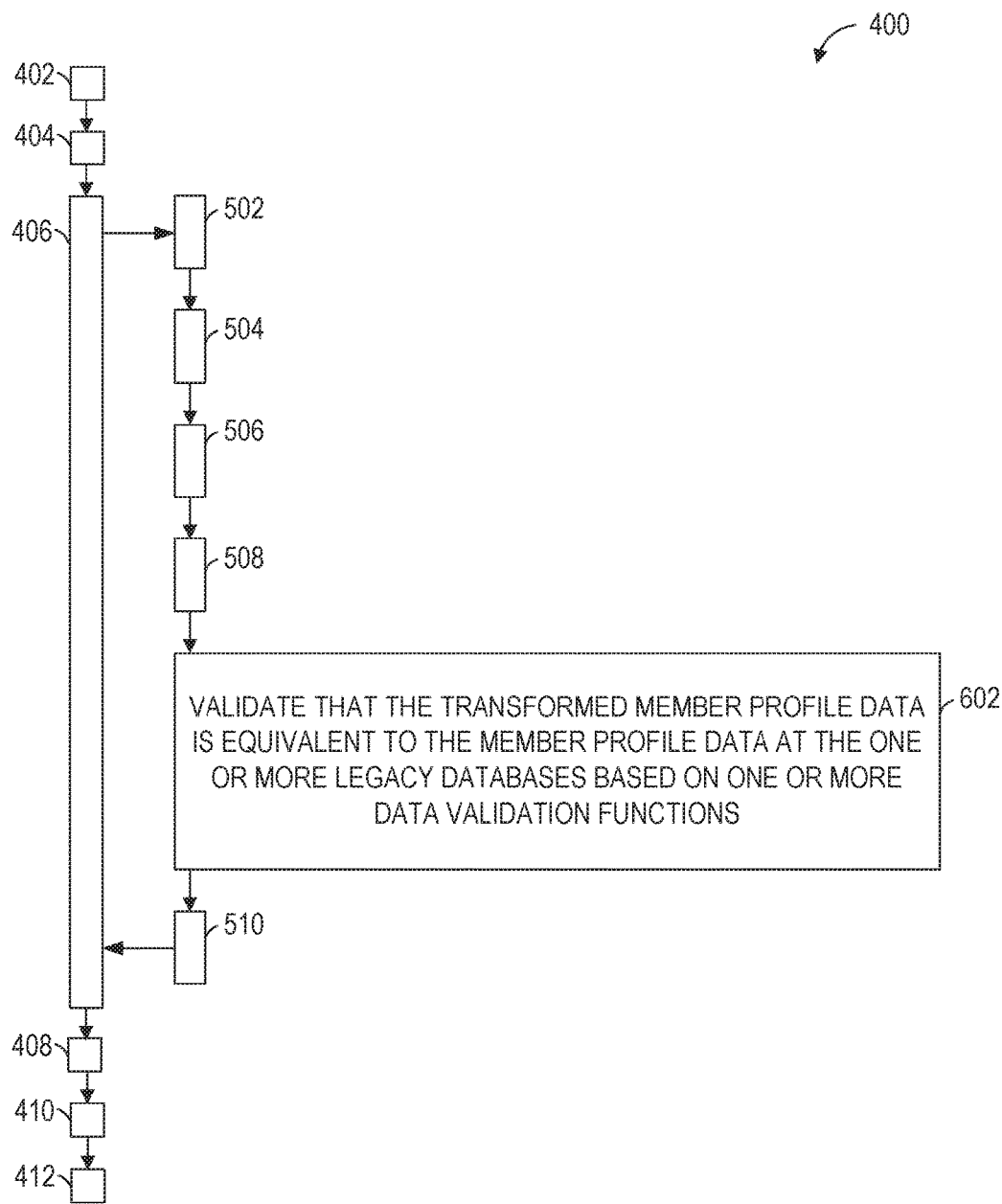
FIG. 6 is a flowchart illustrating a method for controlling the migration of data among databases, and representing an additional step of the method illustrated in FIG. 5, according to some example embodiments.

As shown in FIG. 6, the method 400 may include method operation 602, according to some example embodiments. Operation 602 may be performed after operation 508 of FIG. 5, in which the migration module 204 transforms the accessed member profile data from the first schema to the second schema based on the data transformation procedure.

At operation 602, the testing module 206 validates that the transformed member profile data at the consolidated database is equivalent to the member profile data at the one or more legacy databases based on one or more data validation functions, as discussed above. In some example embodiments, to validate that the transformed member profile data at the consolidated database is equivalent to the member profile data at the one or more legacy databases, the testing module 206 verifies the transformed (e.g., converted) data against the source data to determine whether the source data and the transformed data are equivalent. For example, the testing module 206 utilizes a reverse conversion function, such as f'(y)=x to determine whether the representation of the data is the same regardless of the change in format (e.g., structure, organization, etc.) from the schema associated with the source data (e.g., the member profile data at the one or more legacy databases) to the schema associated with the target, transformed data (e.g., the member profile data at the consolidated database), and vice versa.

In various example embodiments, the testing module 206 executes tests to validate the equivalence of fields with direct mappings (e.g., first name, last name, etc.), the order of profile sections within the member profile (e.g., job positions, education, skills, etc.), the order of individual entities within a section (e.g., individual positions, education, etc.), the preservation of member profile data translated into multiple languages, the equivalence of null or empty fields with defaults as specified by domain business logic, etc.

Figure 7:
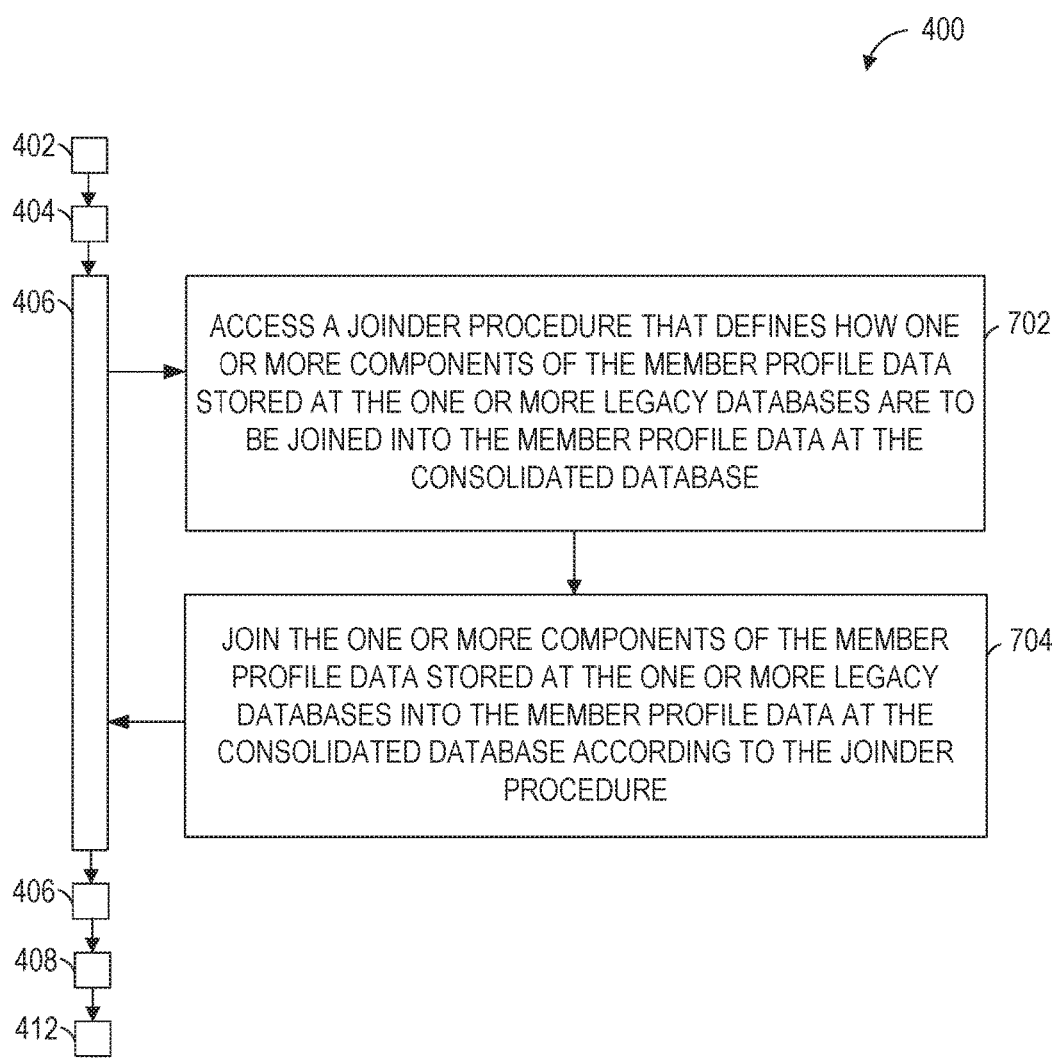
FIG. 7 is a flowchart illustrating a method for controlling the migration of data among databases, and representing step 406 of the method illustrated in FIG. 4 in more detail, according to some example embodiments.

As shown in FIG. 7, the method 400 may include one or more of the method operations 702 or 704, according to some example embodiments. Operation 702 may be performed as part (e.g., a precursor task, a subroutine, or a portion) of operation 406 of FIG. 4, in which the migration module 204 causes a replication of the accessed member profile data at the consolidated database.

At operation 702, the migration module 204 access a joinder procedure that defines how one or more components of the member profile data stored at the one or more legacy databases are to be joined into the member profile data at the consolidated database. In some example embodiments, the one or more components of the member profile data of a member of the SNS correspond to one or more attributes that describe the member of the SNS. The joinder procedure may be stored in the procedures database 136.

At operation 704, the migration module 204 joins the one or more components of the member profile data stored at the one or more legacy databases into the member profile data at the consolidated database according to the joinder procedure. In some example embodiments, the migration module 208 validates the joined one or more components of the member profile data before storing them in one or more records of the consolidated database.

Example Mobile Device

Figure 8:
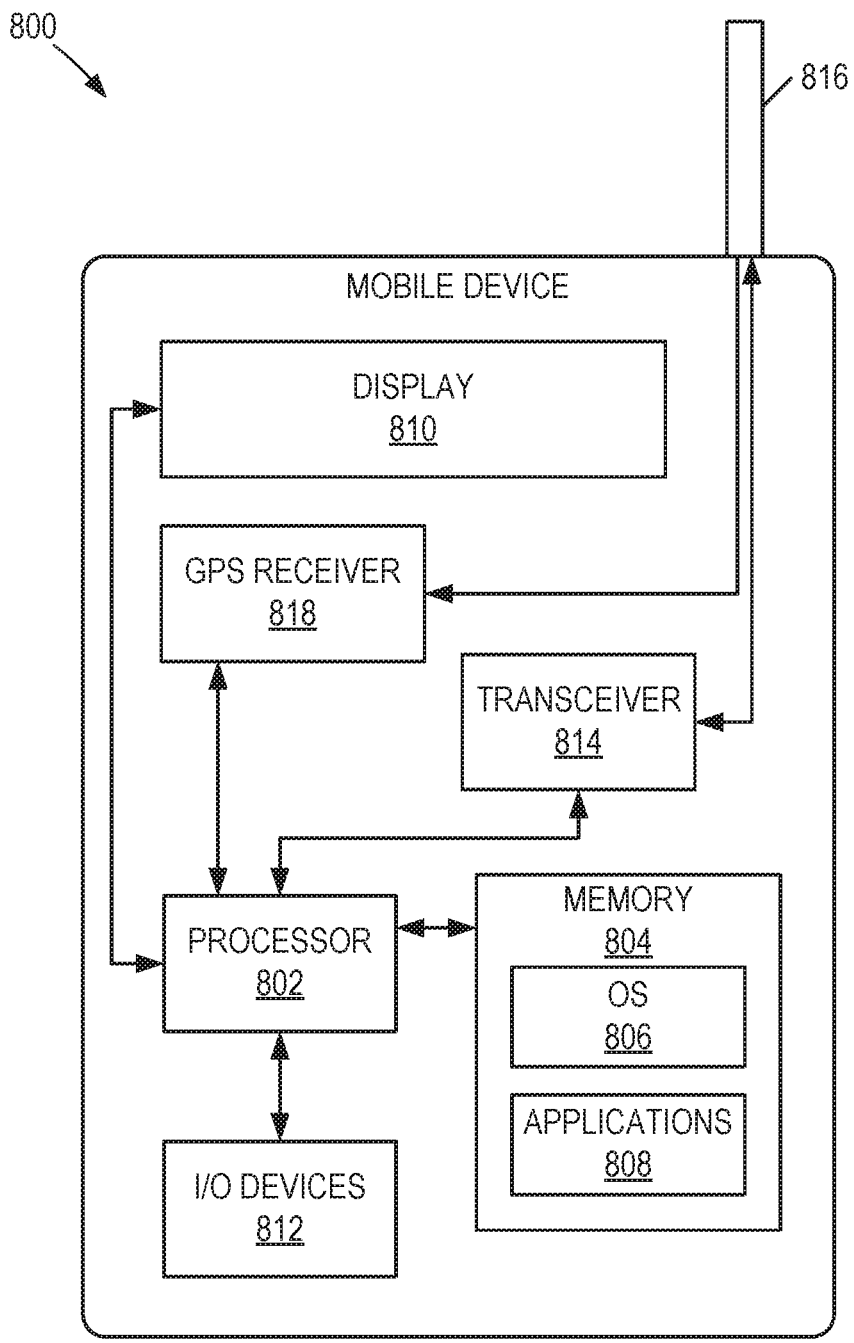
FIG. 8 is a block diagram illustrating a mobile device, according to some example embodiments.

FIG. 8 is a block diagram illustrating a mobile device 800, according to an example embodiment. The mobile device 800 may include a processor 802. The processor 802 may be any of a variety of different types of commercially available processors 802 suitable for mobile devices 800 (for example, an XScale architecture microprocessor, a microprocessor without interlocked pipeline stages (MIPS) architecture processor, or another type of processor 802). A memory 804, such as a random access memory (RAM), a flash memory, or other type of memory, is typically accessible to the processor 802. The memory 804 may be adapted to store an operating system (OS) 806, as well as application programs 808, such as a mobile location enabled application that may provide LBSs to a user. The processor 802 may be coupled, either directly or via appropriate intermediary hardware, to a display 810 and to one or more input/output (I/O) devices 812, such as a keypad, a touch panel sensor, a microphone, and the like. Similarly, in some embodiments, the processor 802 may be coupled to a transceiver 814 that interfaces with an antenna 816. The transceiver 814 may be configured to both transmit and receive cellular network signals, wireless data signals, or other types of signals via the antenna 816, depending on the nature of the mobile device 800. Further, in some configurations, a GPS receiver 818 may also make use of the antenna 816 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium

Figure 9:
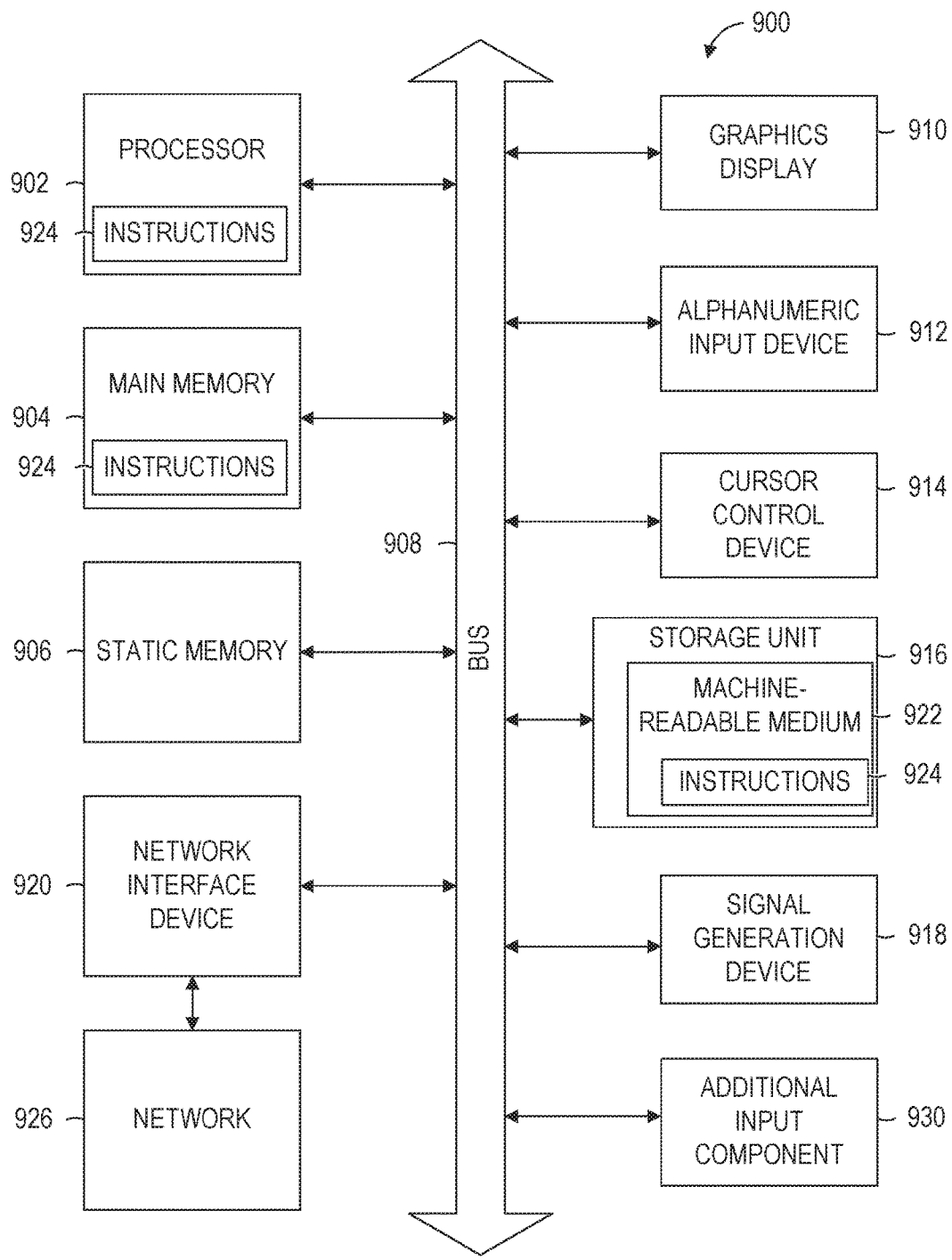
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an applet, an app, or other executable code) for causing the machine 900 to perform any one or more of the methodologies discussed herein may be executed, in whole or in part.

In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include any collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a cursor control device 914 (e.g., a mouse, a touchpad, a trackball, a joystick, a motion sensor, an eye tracking device, or other pointing instrument), a storage unit 916, an audio generation device 918 (e.g., a sound card, an amplifier, a speaker, a headphone jack, or any suitable combination thereof), and a network interface device 920.

The storage unit 916 includes the machine-readable medium 922 (e.g., a tangible and non-transitory machine-readable storage medium) on which are stored the instructions 924 embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered machine-readable media (e.g., tangible and non-transitory machine-readable media). The instructions 924 may be transmitted or received over the network 926 via the network interface device 920. For example, the network interface device 920 may communicate the instructions 924 using any one or more transfer protocols (e.g., hypertext transfer protocol (HTTP)).

In some example embodiments, the machine 900 may be a portable computing device, such as a smart phone or tablet computer, and have one or more additional input components 930 (e.g., sensors or gauges). Examples of such input components 930 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 924 for execution by the machine 900, such that the instructions 924, when executed by one or more processors of the machine 900 (e.g., processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:

determining a control signal value of a control signal attribute based on accessing the control signal attribute at a record of a database, the control signal value indicating a migration state of a migration of member profile data associated with one or more members of a Social Networking Service (SNS) from one or more legacy databases to a consolidated database, the control signal value being associated with one or more member identifiers of the one or more members;

at a time indicated by a timestamp associated with the control signal value, based on the one or more member identifiers associated with the control signal value, accessing member profile data associated with the one or more member identifiers at the one or more legacy databases, and causing a replication of the accessed member profile data at the consolidated database, the causing of the replication including transforming the member profile data from a first schema associated with the one or more legacy databases to a second schema associated with the consolidated database;

upon the causing of the replication of the member profile data at the consolidated database, performing, using one or more hardware processors, a data equivalency test based on the member profile data at the one or more legacy databases and the member profile data at the consolidated database; and based on a result of the data equivalency test, modifying the control signal value to indicate a further migration state of the migration of the member profile data associated with the one or more members.

2. The method of claim 1, wherein the result of the data equivalency test indicates that a recent change to the member profile data of a particular member has not propagated to the consolidated database, and wherein the modifying of the control signal value to indicate the further migration state includes modifying the control signal value to indicate a second migration state, the second migration state indicating that slave read requests are to be directed to the consolidated database, and the write requests and read requests associated with a read-after-write consistency rule are to be directed to the one or more legacy databases.

3. The method of claim 1, wherein the result of the data equivalency test indicates that a recent change to the member profile data of a particular member has propagated to the consolidated database, and wherein the modifying of the control signal value to indicate the further migration state includes modifying the control signal value to indicate a third migration state, the third migration state indicating that slave read requests, and write requests and read requests associated with a read-after-write consistency rule are to be directed to the consolidated database.

4. The method of claim 1, further comprising:

listening, during a window of time, for tracking events that indicate that one or more members are editing one or more member profiles in real time; and determining that no tracking events are received during the window of time, wherein the modifying of the control signal value to indicate the further migration state is further based on the determining that no tracking events are received during the window of time, and includes modifying the control signal value to indicate a fourth migration state, the fourth migration state indicating that read requests and write requests are to be directed to the consolidated database.

5. The method of claim 1, wherein the causing of the replication of the accessed member profile data at the consolidated database includes:

determining that the first schema defines an organization of the member profile data at the one or more legacy databases;

determining that the second schema defines an organization of the member profile data at the consolidated database;

accessing a data transformation procedure that defines a transformation of member profile data from the first schema to the second schema;

transforming the accessed member profile data from the first schema to the second schema based on the data transformation procedure; and generating a record in the consolidated database that includes the member profile data transformed from the first schema to the second schema.

6. The method of claim 5, wherein the determining that the first schema defines the organization of the member profile data at the one or more legacy databases includes:

identifying one or more parameters of the first schema based on analyzing a structure of the member profile data at the one or more legacy databases.

7. The method of claim 5, further comprising:

validating that the transformed member profile data at the consolidated database is equivalent to the member profile data at the one or more legacy databases based on one or more data validation functions.

8. The method of claim 1, wherein the performing of the data equivalency test includes determining that the member profile data at the consolidated database is equivalent with the member profile data at the one or more legacy databases based on:

identifying a first version of the member profile data associated with a member of the one or more members at the one or more legacy databases, identifying a second version of the member profile data associated with the member at the consolidated database, and determining that the first version of the member profile data and the second version of the member profile data are the same.

9. The method of claim 1, wherein one or more components of the member profile data of a member of the SNS correspond to one or more attributes that describe the member of the SNS.

10. The method of claim 1, wherein the causing of the replication of the accessed member profile data at the consolidated database further comprises:

accessing a joinder procedure that defines how one or more components of the member profile data stored at the one or more legacy databases are to be joined into the member profile data at the consolidated database, and wherein the transforming includes joining the one or more components of the member profile data stored at the one or more legacy databases into the member profile data at the consolidated database according to the joinder procedure.

11. A system comprising:
one or more hardware processors; and
a machine-readable medium for storing instructions that, when executed by the one or more hardware processors, cause the one or more hardware processors to perform operations comprising:
determining a control signal value of a control signal attribute based on accessing the control signal attribute at a record of a database, the control signal value indicating a migration state of a migration of member profile data associated with one or more members of a Social Networking Service (SNS) from one or more legacy databases to a consolidated database, the control signal value being associated with one or more member identifiers of the one or more members;
at a time indicated by a timestamp associated with the control signal value,
based on the one or more member identifiers associated with the control signal value, accessing member profile data associated with the one or more member identifiers at the one or more legacy databases, and
causing a replication of the accessed member profile data at the consolidated database, the causing of the replication including transforming the member profile data from a first schema associated with the one or more legacy databases to a second schema associated with the consolidated database;
upon the causing of the replication of the member profile data at the consolidated database, performing a data equivalency test based on the member profile data at the one or more legacy databases and the member profile data at the consolidated database; and
based on a result of the data equivalency test, modifying the control signal value to indicate a further migration state of the migration of the member profile data associated with the one or more members.

12. The system of claim 11, wherein the result of the data equivalency test indicates that a recent change to the member profile data of a particular member has not propagated to the consolidated database, and
wherein the modifying of the control signal value to indicate the further migration state includes modifying the control signal value to indicate a second migration state, the second migration state indicating that slave read requests are to be directed to the consolidated database, and the write requests and read requests associated with a read-after-write consistency rule are to be directed to the one or more legacy databases.

13. The system of claim 11, wherein the result of the data equivalency test indicates that a recent change to the member profile data of a particular member has propagated to the consolidated database, and
wherein the modifying of the control signal value to indicate the further migration state includes modifying the control signal value to indicate a third migration state, the third migration state indicating that slave read requests, and write requests and read requests associated with a read-after-write consistency rule are to be directed to the consolidated database.

14. The system of claim 11, wherein the operations further comprise:
listening, during a window of time, for tracking events that indicate that one or more members are editing one or more member profiles in real time; and
determining that no tracking events are received during the window of time, and wherein the modifying of the control signal value to indicate the further migration state is further based on the determining that no tracking events are received during the window of time, and includes modifying the control signal value to indicate a fourth migration state, the fourth migration state indicating that read requests and write requests are to be directed to the consolidated database.

15. The system of claim 11, wherein the causing of the replication of the accessed member profile data at the consolidated database includes:
determining that the first schema defines an organization of the member profile data at the one or more legacy databases;
determining that the second schema defines an organization of the member profile data at the consolidated database;
accessing a data transformation procedure that defines a transformation of member profile data from the first schema to the second schema;
transforming the accessed member profile data from the first schema to the second schema based on the data transformation procedure; and
generating a record in the consolidated database that includes the member profile data transformed from the first schema to the second schema.

16. The system of claim 15, wherein the determining that the first schema defines the organization of the member profile data at the one or more legacy databases includes:
identifying one or more parameters of the first schema based on analyzing a structure of the member profile data at the one or more legacy databases.

17. The system of claim 15, wherein the operations further comprise:
validating that the transformed member profile data at the consolidated database is equivalent to the member profile data at the one or more legacy databases based on one or more data validation functions.

18. The system of claim 11, wherein the performing of the data equivalency test includes determining that the member profile data at the consolidated database is equivalent with the member profile data at the one or more legacy databases based on:
identifying a first version of the member profile data associated with a member of the one or more members at the one or more legacy databases,
identifying a second version of the member profile data associated with the member at the consolidated database, and
determining that the first version of the member profile data and the second version of the member profile data are the same.

19. The method of claim 11, wherein the causing of the replication of the accessed member profile data at the consolidated database further comprises:
accessing a joinder procedure that defines how one or more components of the member profile data stored at the one or more legacy databases are to be joined into the member profile data at the consolidated database, and
wherein the transforming includes joining the one or more components of the member profile data stored at the one or more legacy databases into the member profile data at the consolidated database according to the joinder procedure.

20. A non-transitory machine-readable storage medium comprising instructions that, when executed by one or more processors of a machine, cause the one or more processors to perform operations comprising:

determining a control signal value of a control signal attribute based on accessing the control signal attribute at a record of a database, the control signal value indicating a migration state of a migration of member profile data associated with one or more members of a Social Networking Service (SNS) from one or more legacy databases to a consolidated database, the control signal value being associated with one or more member identifiers of the one or more members;

at a time indicated by a timestamp associated with the control signal value,
based on the one or more member identifiers associated with the control signal value, accessing member profile data associated with the one or more member identifiers at the one or more legacy databases, and
causing a replication of the accessed member profile data at the consolidated database, the causing of the replication including transforming the member profile data from a first schema associated with the one or more legacy databases to a second schema associated with the consolidated database;

upon the causing of the replication of the member profile data at the consolidated database, performing a data equivalency test based on the member profile data at the one or more legacy databases and the member profile data at the consolidated database; and based on a result of the data equivalency test, modifying the control signal value to indicate a further migration state of the migration of the member profile data associated with the one or more members.

* * * * *